United States Patent
Hatakeyama

(10) Patent No.: US 9,933,690 B2
(45) Date of Patent: Apr. 3, 2018

(54) LENS DRIVER ADAPTER, LENS BARREL, AND IMAGE CAPTURING APPARATUS

(71) Applicant: CANON KABUSHIKI KAISHA, Tokyo (JP)

(72) Inventor: Yasuhiro Hatakeyama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/191,733

(22) Filed: Jun. 24, 2016

(65) Prior Publication Data

US 2017/0003576 A1  Jan. 5, 2017

(30) Foreign Application Priority Data

Jun. 30, 2015 (JP) ................... 2015-130673

(51) Int. Cl.
G03B 17/14 (2006.01)
G02B 7/04 (2006.01)
H04N 5/225 (2006.01)
H04N 5/232 (2006.01)

(52) U.S. Cl.
CPC ............ G03B 17/14 (2013.01); G02B 7/04 (2013.01); H04N 5/2254 (2013.01); H04N 5/23209 (2013.01)

(58) Field of Classification Search
CPC .. G03B 17/14; H04N 5/23209; H04N 5/2254; G02B 7/04
See application file for complete search history.

(56) References Cited

U.S. PATENT DOCUMENTS

2015/0138437 A1* 5/2015 Matsuura ............... G02B 7/102
348/374

FOREIGN PATENT DOCUMENTS

| JP | H582174 U | 11/1993 |
|---|---|---|
| JP | 2002090613 A | 3/2002 |
| JP | 2007108373 A | 4/2007 |

* cited by examiner

Primary Examiner — Twyler Haskins
Assistant Examiner — Angel L Garces-Rivera
(74) Attorney, Agent, or Firm — Rossi, Kimms & McDowell LLP

(57) ABSTRACT

The lens drive adapter is detachably attachable to a lens barrel on which an operation member and a lens electric contact portion are provided. The adapter includes a drive unit including a drive member configured to transmit a driving force to the operation member, an adapter electric contact portion configured to contact the lens electric contact portion to be electrically connected therewith, and two adapter coupling portions configured to couple with the lens barrel at its two circumferential locations to fix the adapter to the lens barrel. The adapter electric contact portion is provided, in a first direction corresponding to an optical axis direction of the lens barrel, at a position different from that of the drive member and between the two adapter coupling portions.

5 Claims, 3 Drawing Sheets

LENS DRIVER ADAPTER, LENS BARREL, AND IMAGE CAPTURING APPARATUS

BACKGROUND OF THE INVENTION

Field of the Invention

The present invention relates to a lens drive adapter detachably attachable to a lens barrel and able to drive an operation member of the lens barrel.

Description of the Related Art

Lens barrels are mostly provided with an operation member such as an operation ring operable by a user for manual zooming or manual focusing. Japanese Patent Laid-Open No. 2007-108373 and others disclose lens drive adapters detachably attachable to a lens barrel and configured to electrically drive, using an actuator, an operation member provided on the lens barrel.

Such lens drive adapters include one configured to drive the operation member while communicating with a camera. For example, the lens drive adapter capable of communicating with the camera through a cable can be operated from the camera.

However, such a configuration connecting the lens drive adapter with the camera through the cable may impede construction of a compact and easy-to-use camera system.

Therefore, the lens drive adapter disclosed in Japanese Patent Laid-Open No. 2007-108373 is provided with electric contacts for receiving power from the lens barrel and sending and receiving signals to and from the lens barrel.

In order to miniaturize the lens barrel to which the lens drive adapter is attachable and to dispose the operation member (operation ring) with a certain degree of freedom, the lens drive adapter is desirable to be fixed to the lens barrel at its optical-axis-directional end (at two circumferential locations on the lens barrel), that is, to be cantilever-supported.

However, when the electric contacts provided on such a cantilever-supported lens drive adapter connect with electric contacts provided on the lens barrel, if an external force such as an impact displaces the lens drive adapter with respect to the lens barrel, the connection of the electric contacts may become unstable. Thus, it is necessary to prevent such a displacement of the lens drive adapter with respect to the lens barrel due to the external force.

SUMMARY OF THE INVENTION

The present invention provides a lens drive adapter that is cantilever-supported by a lens barrel and capable of stably connecting its electric contacts with electric contacts provided on the lens barrel. The present invention further provides a lens barrel, a lens apparatus and an image capturing apparatus to which the lens drive adapter is detachably attachable.

The present invention provides as an aspect thereof a lens drive adapter detachably attachable to a lens barrel on which an operation member and a lens electric contact portion are provided. The lens drive adapter includes a drive unit including a drive member configured to transmit a driving force to the operation member, an adapter electric contact portion configured to contact the lens electric contact portion to be electrically connected therewith, and two adapter coupling portions configured to couple with the lens barrel at its two circumferential locations to fix the adapter to the lens barrel. The adapter electric contact portion is provided, in a first direction corresponding to an optical axis direction of the lens barrel, at a position different from that of the drive member and between the two adapter coupling portions.

The present invention provides as another aspect thereof a lens barrel to which the above lens drive adapter is detachably attachable. The lens barrel includes the operation member, two lens coupling portions provided at the two circumferential locations, and the lens electric contact portion. The lens electric contact portion is provided, in the optical direction, at a position between the two lens coupling portions.

The present invention provides as yet another aspect thereof a lens apparatus including the above lens barrel that holds lenses and to which the above lens drive adapter is detachably attachable.

The present invention provides as still another aspect thereof an image capturing apparatus including the above lens barrel that holds lenses and to which the above lens drive adapter is detachably attachable, and an image sensor configured to capture an object image formed by the lenses.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 3:
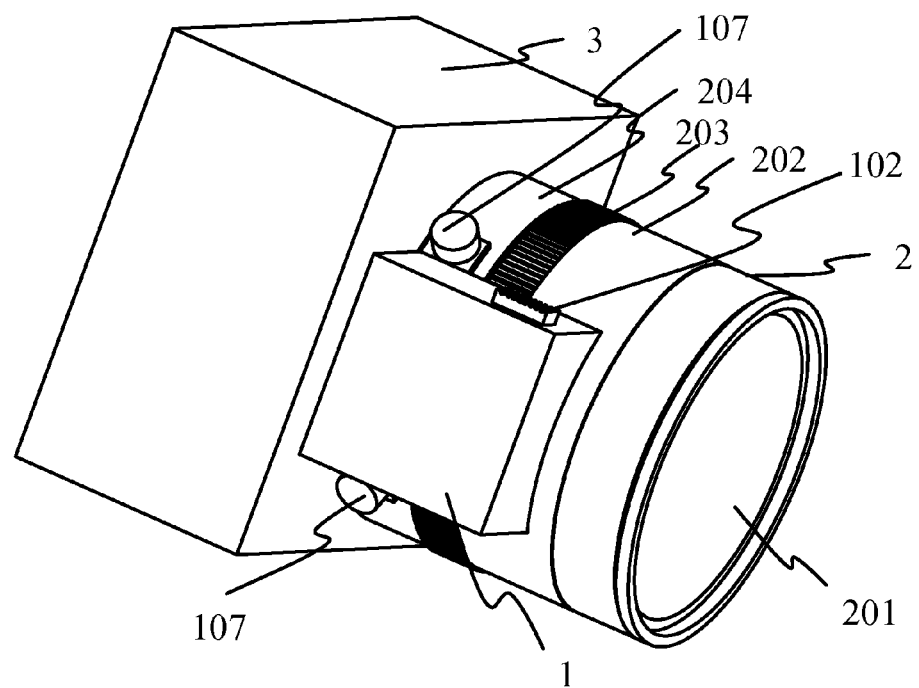
FIG. 3 is a perspective view of the lens drive adapter of the embodiment, the lens barrel and the camera.

FIG. 3 illustrates a lens drive adapter 1 that is an embodiment of the present invention, a lens barrel 2 as a body of an interchangeable lens (lens apparatus) to which the lens drive adapter 1 is attached and a lens-interchangeable digital camera (camera body) 3, which are viewed from their lower side.

The lens barrel 2 and the camera 3 have mounts (not illustrated) as connecting portions and are attached to each other by mechanical coupling of these mounts.

The mounts are provided with electric contacts for communication between the camera 3 and the lens barrel 2 and for power supply from the camera 3 to the lens barrel 2. Among the electric contacts provided in the mounts of the camera 3 and the lens barrel 2, corresponding ones are electrically connected with each other by the coupling of the mounts.

The lens barrel 2 houses thereinside an image capturing optical system 201 including multiple lenses and an aperture stop. On the other hand, on an outer circumferential surface 202 of the lens barrel 2, a lens operation ring 203 as an operation member is provided. The lens operation ring 203 is rotatable about an optical axis of the lens barrel 2. Rotating the lens operation ring 203 enables moving at least one of the lenses included in image capturing optical system 201 in a direction along the optical axis (hereinafter referred to as "an optical axis direction") to vary a focal length and perform focusing. The lens operation ring 203 is provided with a driven gear at its outer circumference.

The lens drive adapter 1 is detachably attachable on a lower part of the outer circumferential surface 202. In the following description, a direction (first direction) in the lens drive adapter 1 corresponding to the optical axis direction of the lens barrel 2 is referred to as "an optical axis direction of the lens drive adapter 1", and a direction in the lens drive adapter 1 corresponding to a circumferential direction of the lens barrel 2 is referred to as "a circumferential direction of the lens drive adapter 1".

The lens drive adapter 1 includes a case 101 serving as an adapter body, an operation switch 102 provided on a side face of the case 101 and two fixing screws 107 serving as two adapter coupling portions (coupling members). The two fixing screws 107 are provided for fixing the case 101 (that is, the lens drive adapter 1) to the lens barrel 2.

Figure 1:
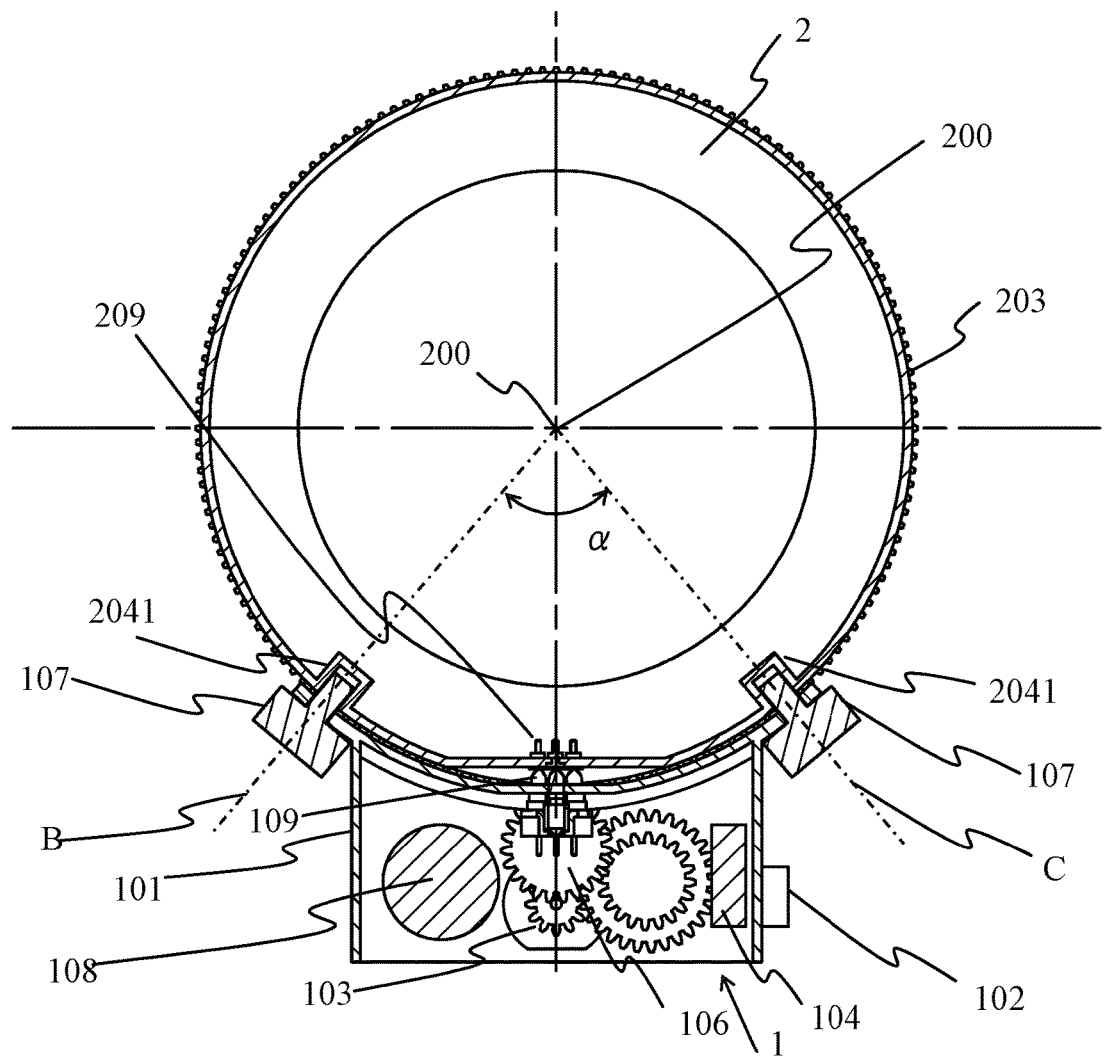
FIG. 1 is a sectional view illustrating an arrangement of electric contact portions of a lens drive adapter and a lens barrel to which the lens drive adapter is attached; the lens drive adapter is an embodiment of the present invention.
Figure 4:
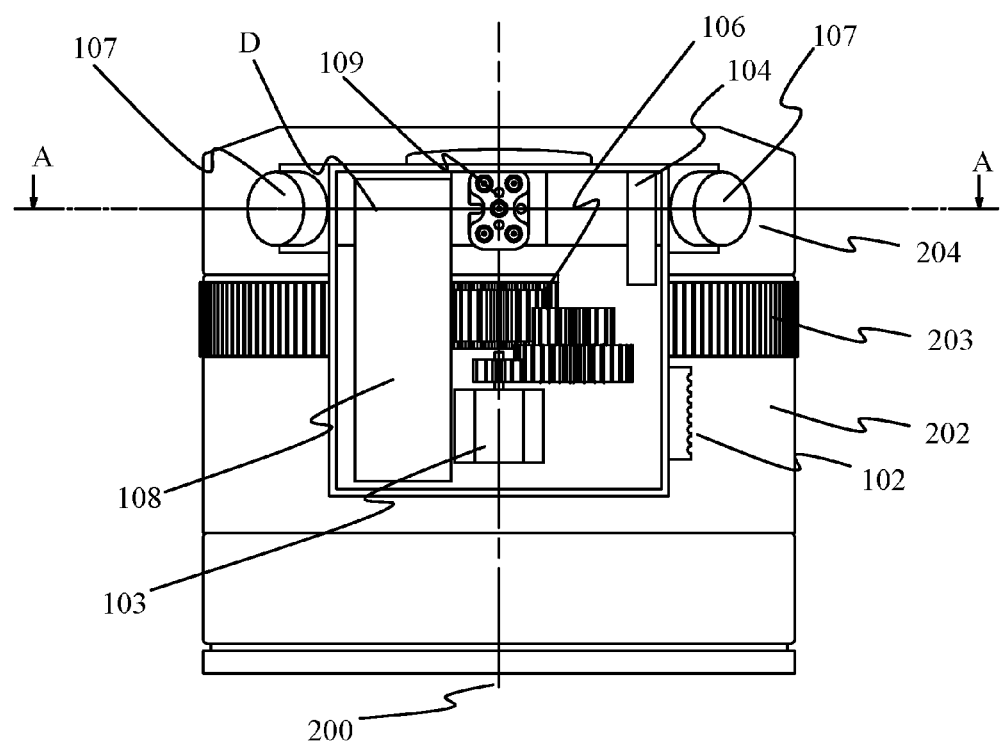
FIG. 4 illustrates a disposition of the lens drive adapter of the embodiment with respect to the lens barrel.

FIG. 4 illustrates a configuration inside the case 101 of the lens drive adapter 1 attached to the lens barrel 2 when viewed from their lower side (that is, from a second direction orthogonal to the optical direction). A lower face of the case 101 is removed in FIG. 4. Reference numeral 200 denotes the optical axis of the lens barrel 2. FIG. 1 illustrates a cross section of the lens drive adapter 1 and the lens barrel 2 cut along an A-A line in FIG. 4; the cross section is orthogonal to the optical axis direction and viewed from the optical axis direction.

As illustrated in FIG. 1, the two fixing screws 107 are respectively screwed in (that is, coupled with) the two female screw portions 2041 serving as lens coupling portions of the lens barrel 2. The two female screw portions 2041 are formed, on an outer circumference of the lens barrel 2, at two circumferential locations in a part closer in the optical axis direction to the mount (the part is hereinafter referred to as "a mount side outer circumferential part") than the lens operation ring 203. The lens drive adapter 1 is thereby fixed to the lens barrel 2. Furthermore, as illustrated in FIGS. 3 and 4, the two fixing screws 107 fix a mount side end part (optical-axis-directional end part) of the case 101 to the lens barrel 2 at two circumferentially extending portions formed in the mount side end part. The lens drive adapter 1 is thereby cantilever-supported by the lens barrel 2.

Although this embodiment uses the fixing screw 107 as the coupling member to fix the lens drive adapter 1 to the lens barrel 2, other coupling members may be used. For example, a magnet may be used that adheres a magnet-adherable portion (lens coupling portion) provided in the lens barrel 2 or an engaging member such as a pin may be used that engages a concave portion (lens coupling portion) formed in the lens barrel 2.

Although this embodiment describes the case where the lens drive adapter 1 is cantilever-supported by the lens barrel 2, it is not necessarily needed that the lens drive adapter 1 is cantilever-supported by the lens barrel 2. In other words, the lens drive adapter 1 may be fixed at its mount side end part and another side end part opposite thereto to the lens barrel 2.

The case 101 houses thereinside and holds a drive unit constituted by a drive source 103 such as a DC motor, a stepping motor or a piezoelectric device, a ring drive gear 106 as a drive member and reduction gears to transmit a drive force from the drive source 103 to the ring drive gear 106.

Figure 2:
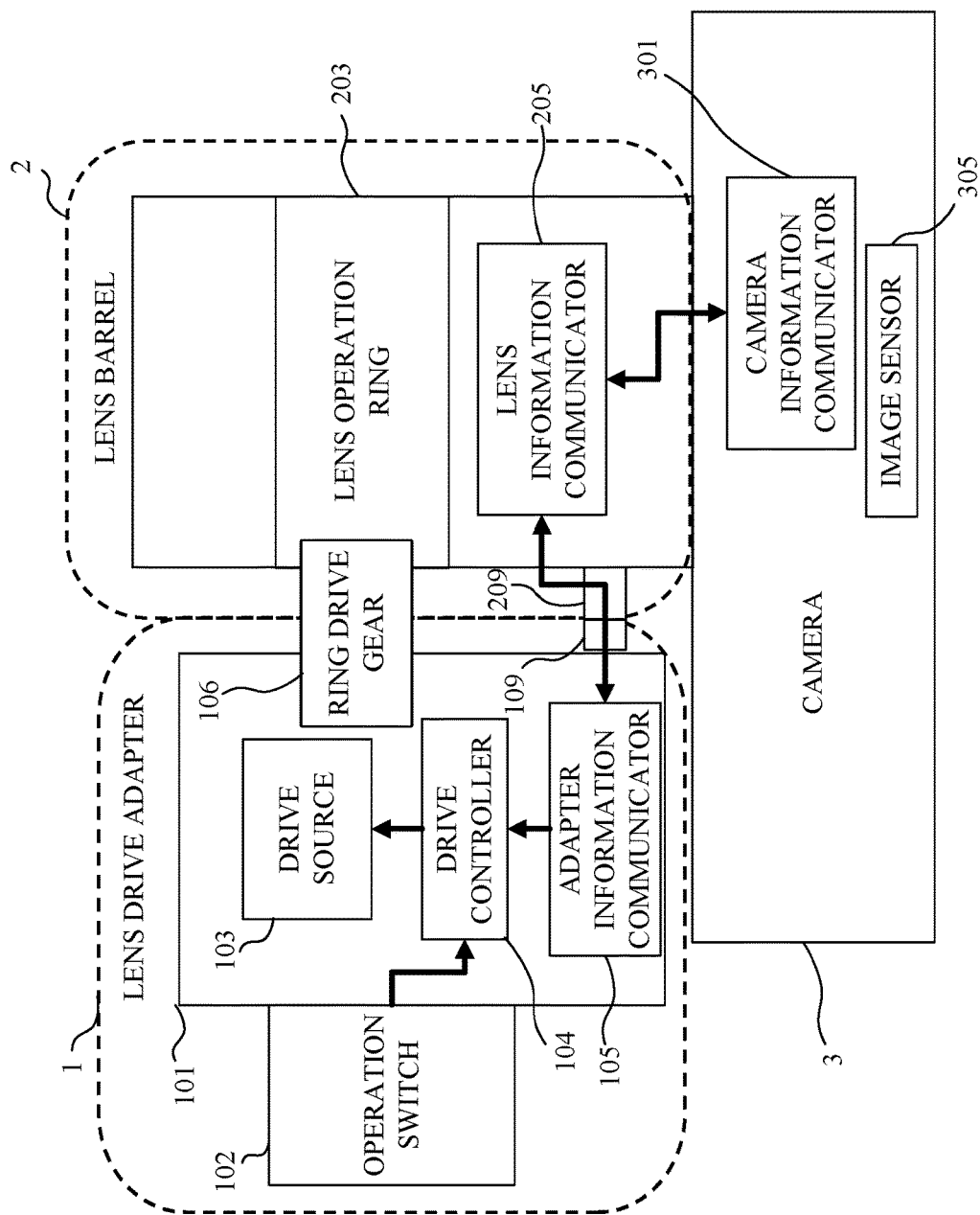
FIG. 2 is a block diagram illustrating an electric connection between the lens drive adapter of the embodiment, the lens barrel and a camera to which the lens barrel is attached.

FIG. 2 illustrates mechanical and electrical connections between the lens drive adapter 1, the lens barrel 2 and the camera 3.

FIGS. 1, 2 and 4 illustrate a drive controller 104 configured to control, in response to operations of the operation switch 102, a drive direction, a drive speed and a drive time of the drive source 103. The ring drive gear 106 meshes (makes contact) with the driven gear of the lens operation ring 203 in a state where the lens drive adapter 1 is attached to the lens barrel 2. The ring drive gear 106 rotated by the driving force from the drive source 103 transmits the driving force to the lens operation ring 203 to rotate the lens operation ring 203.

Although this embodiment uses the ring drive gear 106 as the drive member, other drive members may be used that make contact with and drive the lens operation ring 203, such as a roller or a belt.

FIGS. 1 and 4 further illustrate a battery 108. When the lens drive adapter 1 receives power from the lens barrel 2 or the camera 3, the battery 108 may be removed.

FIG. 2 illustrates an adapter information communicator 105 provided in the lens drive adapter 1. The adapter information communicator 105 is configured to mutually communicate with a lens information communicator 205 provided in the lens barrel 2 through an adapter electric contact portion 109 and a lens electric contact portion 209 respectively provided in the lens drive adapter 1 and the lens barrel 2.

For example, the lens information communicator 205 sends, to the adapter information communicator 105, lens position information on positions of a magnification-varying lens and a focus lens included in the image capturing optical system 201 and focus information on a focus state of the image capturing optical system 201. The drive controller 104 performs the following controls in response to receipt of the lens position information and the focus information through the adapter information communicator 105. The drive controller 104 controls the drive source 103, on a basis of the lens position information, such that each lens does not hit a mechanical end of its movable range. The drive controller 104 further controls the drive speed of the drive source 103, on a basis of the focus information, such that the focus state such as an in-focus state is not changed.

On the other hand, the adapter information communicator 105 sends, to the lens information communicator 205, drive information on a rotation direction, a rotation speed and others of the drive source 103 (or of the ring drive gear 106). The lens barrel 2 controls, in response to receipt of the drive information, for example a drive speed of at least one of the lenses other than the one driven by the lens drive adapter 1 through the lens operation ring 203 depending on its drive speed.

Furthermore, the adapter information communicator 105 receives a drive instruction for the lens drive adapter 1 from the camera 3 through a camera information communicator 301 provided in the camera 3 and the lens information communicator 205. The drive controller 104 controls the drive source 103 in response to receipt of the drive instruction.

The camera 3 is provided with an image sensor 305 configured to photoelectrically convert (capture) an object image formed by the image capturing optical system 201.

Next, with referring to FIGS. 1 and 4, description will be made of a disposition of the adapter electric contact portion 109 and the lens electric contact portion 209 in the lens drive adapter 1 and the lens barrel 2. As described above, the lens drive adapter 1 is fixed in a state of being cantilever-supported by the lens barrel 2 with the configuration in which the fixing screws 107 disposed at the two circumferentially extending portions of the mount side end part of the lens drive adapter 1 (case 101) are screwed in the female screw portions 2041 formed in the mount side outer circumferential part 204 of the lens barrel 2.

The adapter electric contact portion (hereinafter simply referred to as "an adapter contact portion) 109 of the lens drive adapter 1 includes multiple contact pins held by an electrically insulating holding member to be unitized and is held by an upper face of the case 101. The contact pins in the adapter contact portion 109 are connected, through a flexible wiring board (not illustrated), to the adapter information communicator 105, the drive source 103 and others illustrated in FIG. 2.

Each of the contact pins is biased by an elastic member such as a spring toward the lens electric contact portion (hereinafter simply referred to as "a lens contact portion) 209 of the lens barrel 2, which causes each contact pin to positively contact a corresponding contact pin in the lens contact portion 209.

As illustrated in FIG. 4, the adapter contact portion 109 thus configured is disposed, in the optical axis direction (on a plane parallel to the optical axis direction), at a position different from that of the ring drive gear 106 and between the two fixing screws 107 (that is, between the two coupling portions). More strictly, when viewed from the direction orthogonal to the optical axis direction as illustrated in FIG. 4, the adapter contact portion 109 is disposed at a position where at least part of the adapter contact portion 109 overlaps a straight line D connecting the two fixing screws 107 with each other.

Moreover, also in the cross section illustrated in FIG. 1, that is, also when viewed from the optical axis direction, the adapter contact portion 109 is disposed between the two fixing screws 107. In other words, the adapter contact portion 109 is disposed in a range between two straight lines B and C respectively connecting a position of the optical axis 200 of the lens barrel 2 with the two fixing screws 107; the range corresponds to a minor angle α formed by the straight lines B and C.

On the other hand, the lens contact portion 209 provided on the lens barrel 2 is disposed, as understood from FIG. 1, at a position corresponding to that of the adapter contact portion 109 in the mount side outer circumferential part 204 of the lens barrel 2, that is, at an optical-axis-directional position between the two female screw portions (two lens coupling portions) 2041. Furthermore, the lens contact portion 209 is disposed so as to have the same relation with the straight lines B and C illustrating in FIG. 4 as that of the adapter contact portion 109.

The lens contact portion 209 includes, as well as the adapter contact portion 109, multiple contact pins held by an electrically insulating holding member to be unitized. The contact pins in the lens contact portion 209 are connected, through a flexible wiring board (not illustrated), to the lens information communicator 205 illustrated in FIG. 2.

As described above, the adapter contact portion 109 is disposed, in the optical axis direction (also when viewed from the optical axis direction), at the position between the two fixing screws 107. Such a disposition of the adapter contact portion 109 provides the following effects.

If an external force due to a user's operation or an impact applies to the lens drive adapter 1 cantilever-supported by the lens barrel 2 with the fixing screws 107, the case 101 may be deformed and thereby a part of the case 101 away from the fixing screws 107 may be displaced so as to be separated from the lens barrel 2 or twisted with respect to the lens barrel 2.

However, even in such a case, since the adapter contact portion 109 is disposed at an area between the fixing screws 107 that become fulcrum points for the displacement, that is, at a part whose displacement amount is smallest (almost zero), the adapter contact portion 109 can maintain, against the above displacement, a stable connection with the lens contact portion 209. Accordingly, even if the above displacement occurs, the lens drive adapter 1 can continue good communication with the lens barrel 2 and further with the camera 3.

Although the above embodiment described the case where the lens drive adapter is attached to the lens barrel as the interchangeable lens, the lens drive adapter is attachable to a lens barrel of a lens-integrated camera (image capturing apparatus).

As described above, the embodiment enables the adapter contact portion 109 provided on the lens drive adapter 1 to stably connect with the lens contact portion 209 provided on the lens barrel 2. In particular, even if the lens drive adapter 1 cantilever-supported by the lens barrel 2 is displaced with respect to the lens barrel 2 due to the external force, since the adapter contact portion 109 is provided near the fulcrum points for the displacement, the adapter contact portion 109 can maintain a stable connection with the lens contact portion 209.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130673, filed on Jun. 30, 2015, which is hereby incorporated by reference herein in its entirety.

What is claimed is:

1. A lens drive adapter detachably attachable to a lens barrel having an operation member, a lens electric contact portion, and a connecting portion configured to connect with a camera, the lens drive adapter comprising:
   a drive unit including a drive member configured to transmit a driving force to the operation member;
   an adapter electric contact portion configured to contact the lens electric contact portion to be electrically connected therewith; and
   an adapter coupling mechanism configured to couple with the lens barrel at two circumferential locations on the lens barrel to fix the lens drive adapter to the lens barrel,
   wherein the adapter electric contact portion is disposed, in a first direction corresponding to an optical axis direction of the lens barrel, at a position different from that of the drive member and between the two circumferential locations, and
   wherein, in a connected state where the lens drive adapter is attached to the lens barrel, the adapter coupling mechanism is disposed only in a region on a side of the connecting portion and disposed away from the operation member in the optical axis direction.

2. The lens drive adapter according to claim 1, wherein, when viewed from a second direction orthogonal to the first direction, at least part of the adapter electric contact portion overlaps with a straight line connecting the two circumferential locations.

3. The lens drive adapter according to claim 1, wherein, when viewed from the first direction in the connected state, the adapter electric contact portion is disposed in a range of a minor angle formed by two straight lines respectively connecting a position of an optical axis of the lens barrel with the two circumferential locations.

4. A lens barrel to which a lens drive adapter is detachably attachable, the lens barrel comprising:
  a lens;
  an operation member;
  a connecting portion configured to connect with a camera; and
  a lens electric contact portion;
  wherein the lens drive adapter comprises:
    a drive unit including a drive member configured to transmit a driving force to the operation member;
    an adapter electric contact portion configured to contact the lens electric contact portion to be electrically connected therewith; and
    an adapter coupling mechanism configured to couple with the lens barrel at two circumferential locations on the lens barrel to fix the lens drive adapter to the lens barrel,
  wherein the adapter electric contact portion is disposed, in a first direction corresponding to an optical axis direction of the lens barrel, at a position different from that of the drive member and between the two two circumferential locations,
  wherein the lens electric contact portion is disposed, in the optical direction, at a position between the two circumferential locations,
  wherein, in a connected state where the lens drive adapter is attached to the lens barrel, the two circumferential locations are disposed only in a region on a side of the connecting portion and disposed away from the operation member in the optical axis direction, and
  wherein, in the connected state, the adapter coupling mechanism is disposed only in the region on the side of the connecting portion and disposed away from the operation member in the optical axis direction.

5. An image capturing apparatus comprising:
  a lens barrel that holds a lens, to which a lens drive adapter is detachably attachable, and having an operation member, a lens electric contact portion, and a connecting portion configured to connect with a camera; and
  an image sensor configured to capture an object image formed by the lens,
  wherein the lens drive adapter comprises:
    a drive unit including a drive member configured to transmit a driving force to the operation member;
    an adapter electric contact portion configured to contact the lens electric contact portion to be electrically connected therewith; and
    an adapter coupling unit configured to couple with the lens barrel at two circumferential locations on the lens barrel to fix the lens drive adapter to the lens barrel,
  wherein the adapter electric contact portion is disposed, in a first direction corresponding to an optical axis direction of the lens barrel, at a position different from that of the drive member and between the two two circumferential locations,
  wherein the lens electric contact portion is disposed, in the optical direction, at a position between the two circumferential locations,
  wherein, in a connected state where the lens drive adapter is attached to the lens barrel, the two circumferential locations are disposed only in a region on a side of the connecting portion and disposed away from the operation member in the optical axis direction, and
  wherein, in the connected state, the adapter coupling mechanism is disposed only in the region on the side of the connecting portion and disposed away from the operation member in the optical axis direction.

* * * * *